(12) United States Patent
Otobe et al.

(10) Patent No.: US 9,488,462 B2
(45) Date of Patent: Nov. 8, 2016

(54) STRUCTURE FOR MOUNTING RESOLVER

(71) Applicant: MINEBEA CO., LTD., Kitasaku-gun, Nagano (JP)

(72) Inventors: Haruki Otobe, Fukuroi (JP); Mutsumi Matsuura, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 50 days.

(21) Appl. No.: 14/449,658

(22) Filed: Aug. 1, 2014

(65) Prior Publication Data
US 2015/0042322 A1 Feb. 12, 2015

(30) Foreign Application Priority Data

Aug. 7, 2013 (JP) .................................. 2013-164312

(51) Int. Cl.
*G01B 7/30* (2006.01)
*G01D 5/20* (2006.01)

(52) U.S. Cl.
CPC ............... *G01B 7/30* (2013.01); *G01D 5/2046* (2013.01)

(58) Field of Classification Search
CPC ......... G10B 7/30; G01C 19/06; G01C 25/00
USPC .................................................... 324/207.25
See application file for complete search history.

(56) References Cited

U.S. PATENT DOCUMENTS

| 2008/0258585 A1* | 10/2008 | Kataoka | H02K 1/24 310/68 B |
| 2012/0229124 A1* | 9/2012 | Lai | G01B 7/30 324/207.25 |
| 2014/0026688 A1* | 1/2014 | Davis | B64G 1/286 74/5.7 |

FOREIGN PATENT DOCUMENTS

| JP | A-2006-242758 | 9/2006 |
| JP | A-2013-099000 | 5/2013 |

* cited by examiner

*Primary Examiner* — Jermele M Hollington
*Assistant Examiner* — Zannatul Ferdous
(74) *Attorney, Agent, or Firm* — Oliff PLC

(57) ABSTRACT

A structure for mounting a resolver in a housing, in which it is not necessary to use various different plates for forming the stator and accuracy of concentricity of the rotor and the stator is prevented from decreasing by a simple structure, are provided. The structure for mounting a resolver in a housing has a rotor and a stator arranged the outside of the rotor, in which the stator is mounted at an opening of the housing by clamps, projections are formed on an outer peripheral surface of the stator, protruding portions are formed on the clamps, and the stator is pressed to the housing by the clamps in a state in which the protruding portions are engaged with the concavities of the stator.

9 Claims, 5 Drawing Sheets

STRUCTURE FOR MOUNTING RESOLVER

BACKGROUND OF THE INVENTION

Field of the Invention

The present invention relates to a structure for mounting a resolver.

Description of Related Art

As a means for detecting a rotation angle of a motor, a resolver is known. The resolver has a rotor which is fixed to a rotating shaft and is rotated with the rotating shaft, and a stator which is fixed to a housing and is arranged at the outside of the rotor. When the rotor is rotated, the size of an air gap formed between the rotor and the stator changes with the rotation of the rotor. Then, an output corresponding to this change is generated on a detecting coil placed at a stator side, and the rotation angle of the rotor is detected based on this output.

As a structure for fixing a resolver to an object to be mounted, Japanese Unexamined Patent Application Laid-open No. 2013-99000 discloses a structure in which a stator of a resolver is contained in an opening portion of a fixing member and is fixed in a housing by the fixing member. In addition, as a structure for fixing a stator of a resolver to a housing, Japanese Unexamined Patent Application Laid-open No. 2006-242758 discloses a structure in which a protruded flange portion is formed on the outermost surface in a radial direction of stator cores of the resolver, a mounting hole is formed on the flange portion, and the resolver is fixed to the housing by a bolt through the mounting hole.

FIG. 8 shows a cross sectional view of a motor with the resolver shown in Japanese Unexamined Patent Application Laid-open No. 2006-242758. A motor 60 is mounted to a motor housing 63, as shown in FIG. 8. A rotor 68 of a resolver 62 is mounted on an output shaft 61 of the motor 60, and a stator 70 of the resolver 62 is arranged at an outer side of the rotor 68 and is mounted in a motor housing 63 by bolts 69. The stator 70 has a structure in which a plurality of plates formed by punching a magnetic steel sheet in a predetermined shape, etc., is laminated in an axial direction. An end plate 71 arranged at the outermost side of a plurality of plates that constitute the stator 70 has a different shape from those of other plates 72. The end plate 71 has flanges 71c protruding outwardly in a radial direction, as shown in FIG. 9, and mounting holes 71d are formed on each flange 71c, respectively. Then, the stator 70 is fixed to the motor housing 63 by bolts 69 through the mounting holes 71d.

However, the mounting structure of the resolver described in Japanese Unexamined Patent Application Laid-open No. 2013-99000, has a structure in which the stator of the resolver is received in the opening of the fixing member and is fixed in the housing by the fixing member. Therefore, in the case in which machining accuracy of the fixing member is low, there is a problem in that concentricity of the rotor and the stator shifts. When the concentricity of the rotor and the stator shifts, deviation occurs in the air gap between the rotor and the stator that is set to be a predetermined value, and reliability in rotation angle of motor detected based on an output corresponding to the air gap is decreased.

In addition, in the mounting structure of the resolver described in Japanese Unexamined Patent Application Laid-open No. 2006-242758, an end plate 71 arranged at the outermost side of a plurality of plates that constitute the stator 70 has a different shape from those of other plates 72. Therefore, in the case in which a mounting position of the housing for mounting the stator of the resolver disagrees, it is necessary to prepare each end plate that corresponds to the shapes or dimensions thereof, and therefore, the parts cost is increased. Additionally, plates for forming the stator 70 are generally laminated by caulking. However, when plates using two kinds of metals are punched and laminated, work efficiency is deteriorated. Furthermore, in the case in which the mounting position of the housing for mounting the stator of the resolver is different, even if the standard resolver can be used, it is necessary to prepare each end plate that corresponds to the shapes or dimensions thereof, and therefore, the parts cost is increased.

In view of such circumstances, it is an object of the present invention to provide a structure for mounting a resolver in a housing, in which it is not necessary to use various different plates for forming the stator and the accuracy of concentricity of the rotor and the stator is prevented from decreasing by a simple structure.

SUMMARY OF THE INVENTION

A first aspect of the present invention has a structure for mounting a resolver in a housing, including a rotor, and a stator arranged at the outside of the rotor, wherein the stator is mounted to an opening of the housing by clamps, concavities are formed on an outer peripheral surface of the stator, protruding portions are formed on the clamps, and the stator is pressed to the housing by the clamps in a state in which the protruding portions are engaged with the concavities of the stator.

According to the first aspect of the present invention, the object is attained by preparing clamps corresponding to housings having a different structure. Therefore, resolvers having the same stator structure, that is, resolvers having a standard structure, can be used, even if the housings differ, and as a result, increase of production cost can be avoided. In addition, the resolver is mounted in the housing based on the outer peripheral surface of the stator as a standard, and therefore, the problem in that the concentricity between the rotor and the stator shifts can be avoided.

A second aspect of the present invention has the structure for mounting a resolver according to the first aspect, wherein an edge of the stator is protruding in an axial direction from the opening, portions in which the protruding portions are formed separate in an axial direction from portions on the clamp which are contacted with the housing, and the protruding portion of the stator is pressed in an axial direction by the clamp. According to the second aspect of the present invention, the stator can be reliably pressed in an axial direction.

A third aspect of the present invention has the structure for mounting a resolver according to the first aspect, wherein the protruding portion has a slope which goes down outwardly from the top, and the slope is contacted with an edge of the concavity. According to the third aspect of the present invention, errors in machining accuracy of each part are compensated for and a structure without looseness can be obtained.

A fourth aspect of the present invention has the structure for mounting a resolver according to the first aspect, wherein the concavities of the stator are key grooves formed on an outer peripheral surface of the stator, and the protruding portion of the clamp is engaged with the key groove.

A fifth aspect of the present invention has the structure for mounting a resolver according to the first aspect, wherein the concavities of the stator are dowel holes formed at a ring-shaped yoke portion of the stator, and the protruding portion of the clamp is engaged with the dowel hole.

A sixth aspect of the present invention has the structure for mounting a resolver according to the first aspect, wherein the clamp has a C-shape in which a part of a ring shape is cut, and the protruding portion is formed at an inner peripheral side.

According to the present invention, a structure for mounting a resolver in a housing, in which it is not necessary to use various different plates for forming the stator and accuracy of concentricity of the rotor and the stator is prevented from decreasing by a simple structure, can be provided.

PREFERRED EMBODIMENTS OF THE INVENTION

Structure

Figure 1:
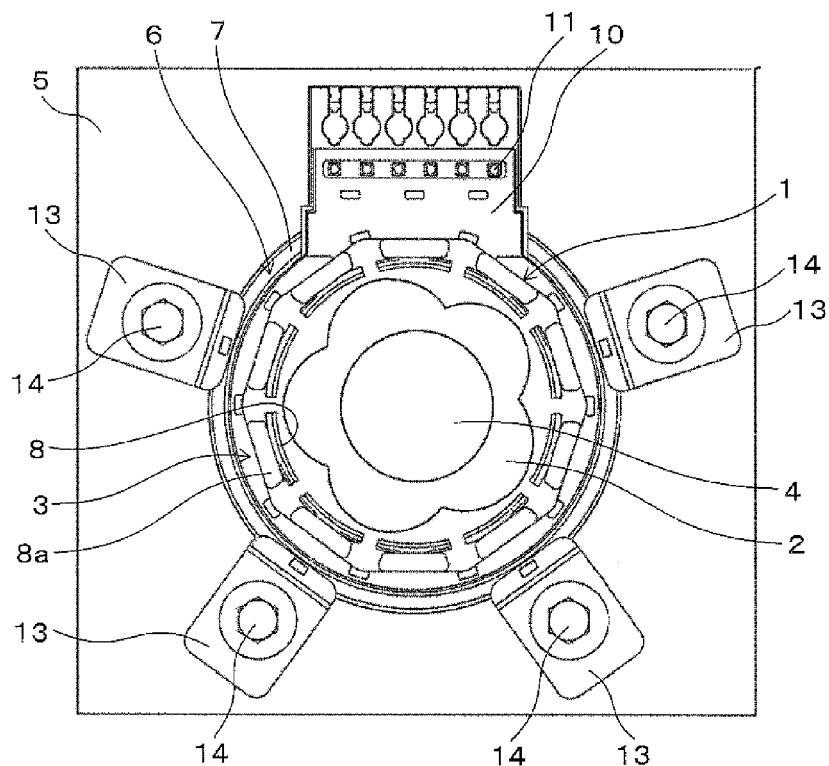
FIG. 1 is a top view showing a mounting structure of a resolver of an embodiment of the present invention.
Figure 2:
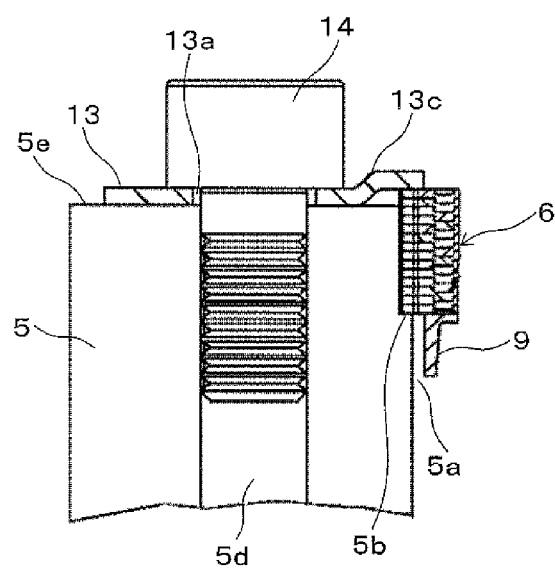
FIG. 2 is a partial cross sectional view explaining the mounting structure of the resolver of the embodiment of the present invention.
Figure 3:
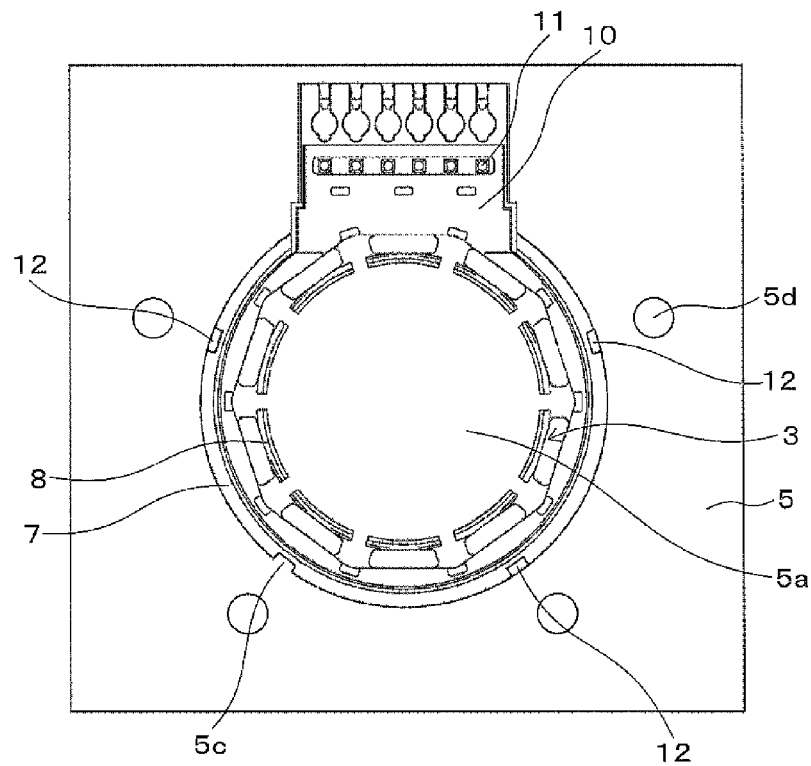
FIG. 3 is a top view showing a state in which the stator of the resolver shown in FIG. 1 is mounted in a housing.

In the following, embodiments of the present invention will be explained with reference to the drawings. FIG. 1 shows a mounting structure of a resolver of an embodiment of the present invention. FIG. 2 shows a partial cross sectional view explaining the mounting structure of the resolver of the embodiment of the present invention. FIG. 3 shows a state in which the stator of the resolver shown in FIG. 1 is mounted in a housing.

FIG. 1 shows a resolver 1 viewed from an axial direction. The resolver 1 is a VR (valuable reluctance) type resolver. The resolver 1 has a rotor 2 and a stator 3. The rotor 2 is fixed to an output shaft 4 of a motor (not shown). The rotor 2 has a noncircular shape viewed from an axial direction, in which a plurality of protruding portions protrude outwardly in a radial direction. The rotor 2 is constituted by laminating a plurality of rotor cores in a thin plate shape.

The rotor core in a thin plate shape that constitutes the rotor 2 is produced by press working a plate made of a magnetic steel sheet to a shape shown in FIG. 1. A plurality of the rotor cores are laminated in an axial direction and is stacked by caulking, and thereby, the rotor 2 is configured. The stator 3 is arranged on the outside of the rotor 2, and is secured to a housing 5. A gap is formed between the rotor 2 and the stator 3, and as a result, the rotor 2 can rotate on the inside of the stator 3. The housing 5 is a member in which the resolver 1 is mounted, and bolt holes 5d for fixing the resolver 1 are formed (see FIG. 3). On inner peripheral surfaces of the bolt holes 5d, female screws are formed, and can be engaged with the bolts 14.

The stator 3 has a stator core assembly 6. The stator core assembly 6 is constituted by laminating a plurality of stator cores in a thin plate shape. The stator core in a thin plate shape has a ring-shaped yoke portion 7 and a plurality of pole teeth 8 is radially extended inward from the yoke portion 7. The stator core is produced by press working a plate made of a magnetic steel sheet. A plurality of the stator cores are laminated in axial direction and are secured by caulking, and therefore, a stator core assembly 6 is configured.

A pair of insulators 9 is mounted from both sides in an axial direction of the stator core assembly 6. The insulator 9 is made of resin, and coils 8a are wound around the pole teeth 8 via the insulators 9, respectively. The coil 8a is formed by an exciting coil and an output coil. The output coil is formed by a sine phase coil for outputting a sine signal and a cosine phase coil for outputting a cosine signal in which a phase thereof is different at 90 degrees from that of the sine signal. Each terminal of the exiting coil and the output coil is electrically connected to terminal pins 11 that are provided on a terminal stand 10 integrally formed on the insulator 9. Here, in the figures, coils connected to the terminal pins are omitted for convenience. Then, a plurality of key grooves 12 are formed on the outer peripheral surface of the stator core assembly 6 so as to pass therethrough in an axial direction.

In the following, a structure for fixing the resolver 1 to the housing 5 will be explained. First, an opening 5a for receiving the resolver 1 is formed on the housing 5, as shown in FIG. 3. The opening 5a has a hollow cylindrical shape which is an approximate circle viewed from an axial direction. A projection 5c is formed on the inner peripheral surface of the opening 5a.

In a state in which the stator 3 is received in the opening 5a, the outer peripheral surface of the stator core assembly 6 (see FIG. 2) is fitted with the inner peripheral surface of the opening 5a. In this state, the projection 5c on the housing 5 is engaged with one of the key grooves 12 on the stator 3. Additionally, in this state, an edge in an axial direction of the stator core assembly 6 is contacted with a step 5b formed on the inner peripheral surface of the opening 5a, and as a result, the stator 3 (the stator core assembly 6) is positioned in the axial direction against the housing 5. Then, in a state in which the stator 3 is received in the opening 5a of the housing 5, the stator 3 is pressed to the housing 5 by clamps 13 and is secured.

Figure 4:
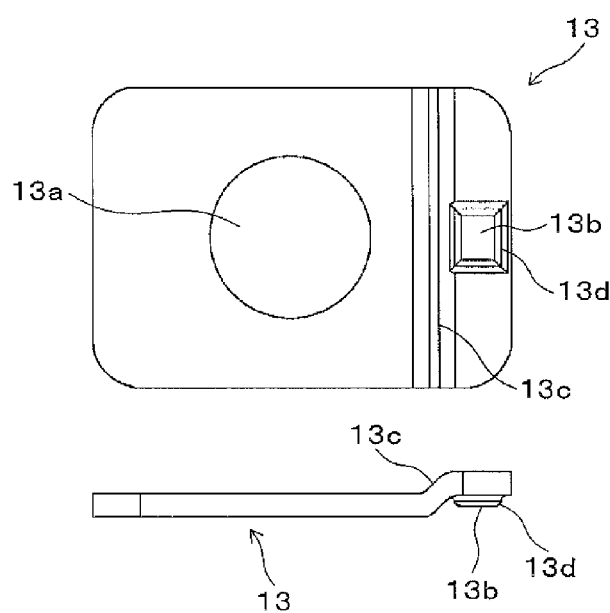
FIG. 4 is a top view and a cross sectional view showing a clamp shown in FIG. 1.

As shown in FIG. 4, the clamp 13 has a rectangle shape, and is produced by press working a plate made of non-magnetic metal material. A bolt passing hole 13a for passing the bolt 14 (see FIG. 1) is formed at an approximate center of the clamp 13. Here, the bolt passing hole 13a may be a long hole or a hole having a larger diameter than a screw portion of the bolt 14, so as to compensate errors with respect to positions of bolt holes 5d (see FIG. 3). In addition, one side of the clamp 13 is bent, and a protruding portion 13b is formed on the tip of the bent side. The protruding portion 13b is formed by for example, square dowel processing.

In the state in which the stator 3 is received in the opening 5a of the housing 5 (a state shown in FIG. 3), the protruding portion 13b of the clamp 13 is fitted with the key groove 12 of the stator core assembly 6 (see FIG. 3). Then, in this state, the clamp 13 is pressed to a mounting surface 5e of the housing 5 from an upper side in an axial direction (see FIG. 2), and the bolt 14 is screwed into the bolt hole 5d (see FIG. 3) through the bolt passing hole 13a (see FIG. 4), so that the bolt 14 is tightened. Consequently, the stator 3 is pressed to the housing 5 by the clamp 13 and is secured.

In addition, in the state in which the stator 3 is fixed to the opening 5a of the housing 5, an end surface in the axial direction of the stator core assembly 6 is slightly protruded from the mounting surface 5e of the housing 5. A bent portion 13c of the clamp 13 is set to have a bent width that is similar to a protruding length, and the stator 3 is pressed by the clamp 13 so as to not move from the housing 5 upward in the axial direction. That is, the protruded portion 13b is set to slightly separate from the mounting surface 5e by forming the bent portion 13c, and the end surface of the stator core assembly 6 which is slightly protruded from the mounting surface 5e is pressed in the axial direction by the clamp 13. According to this structure, looseness in the axial direction of the stator 3 is not generated.

The protruded portion 13b has a structure in which a cross section shape is an approximate inverted V-shape or an approximate trapezoid, and has a slope 13d which goes outwardly down from the top. Then, this slope 13d is contacted with the edge of the key groove 12, and therefore, the stator core assembly 6 (stator 3) is pressed to the housing 5 by the clamp 13. According to this structure, looseness is not generated between the clamp 13 and the stator core assembly 6 (stator 3). Furthermore, even if any error occurs in the dimensional accuracy of each part, it can be compensated.

The clamp 13 is produced by press working a plate made of non-magnetic metal material. Here, the clamp 13 may be made of magnetic material unless magnetic characteristics are affected. The number of the clamp 13 in the present embodiment is four; however, the number is not limited to four.

Advantages

According to this embodiment, it is not necessary to prepare a resolver having a different structure, and standard resolvers can be used, even if the resolver 1 is mounted to an object in which the bolt holes 5d of the housing 5 are formed at different positions for example, etc. Therefore, production cost can be decreased by having a simple structure. That is, it is not necessary to prepare various kinds of plates to constitute the stator, and parts cost and production cost of the resolver are not increased, since a production process of the stator is simplified. Furthermore, the structure using the clamp 13 is simple and does not increase the production cost, while at the same time is of general form and can be mounted to various objects.

The resolver is mounted in the housing based on the outer peripheral surface of the stator as a standard, and therefore, there is no problem in that concentricity of the rotor and the stator shifts when the resolver is mounted in the housing. As this result, there is no problem of decrease in reliability of the rotation angle of the motor detected based on an air gap that changes as the rotor rotates.

Other Matters

In the present embodiment, the protruding portion 13b formed on the clamp 13 is fitted into the key groove 12 formed on the outer peripheral surface of the stator core assembly 6. However, for example, concavities 15 such as a dowel hole are formed on a ring-shaped yoke portion 7 of the stator core, as shown in FIG. 5, and for example, a protruding portion is formed on the clamp 13 by circle dowel processing 16, as shown in FIG. 6, and thereby, this protruding portion 16 may be fitted into the concavities 15.

According to this structure, the concavities 15 can be simultaneously formed on the ring-shaped yoke portion 7 of the stator core when the stator core is produced by press working. Therefore, the resolver 1 can be easily mounted in the housing 5 by the clamp 13 secured to the stator 3. As this result, the present invention can provide a mounting structure of a resolver in which the resolver can be mounted in the housing without increasing the production cost of the resolver by a simple structure.

Figure 7:
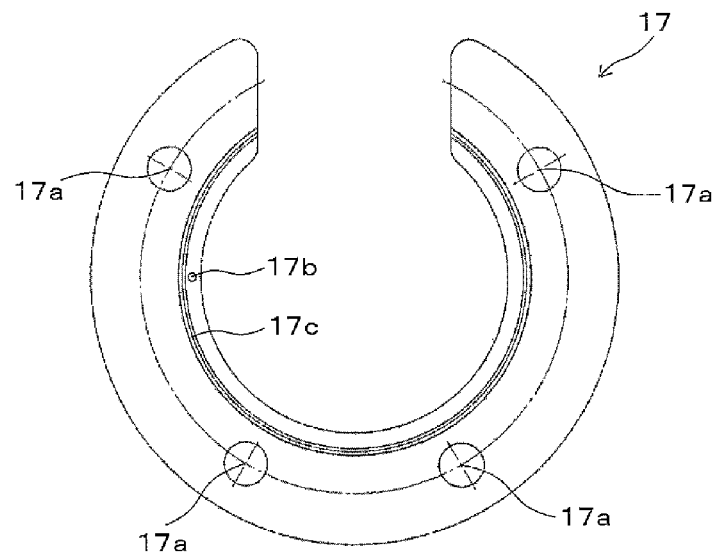
FIG. 7 is a top view showing further another clamp.
Figure 8:
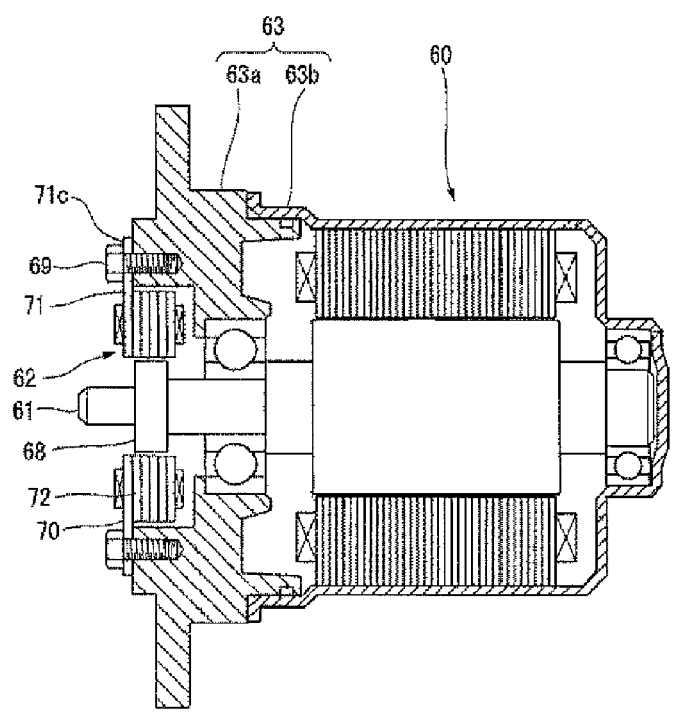
FIG. 8 is a cross sectional view showing a motor with a resolver which having a conventional mounting structure of a resolver.
Figure 9:
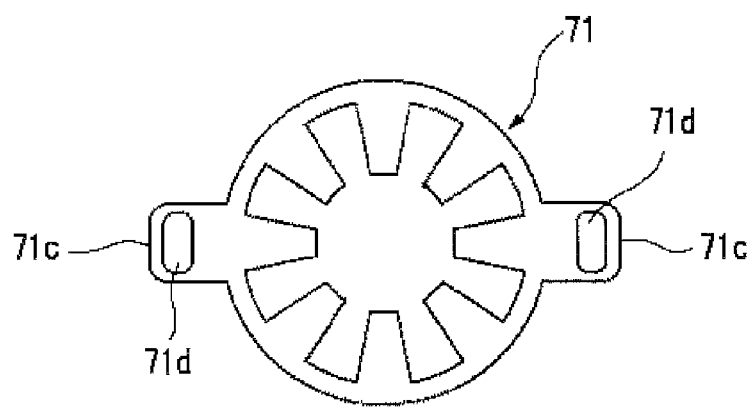
FIG. 9 is a top view showing an end plate shown in FIG. 8.

In the present embodiment, the clamp 13 has a rectangle shape. However, it is not limited to this, and for example, it may be a clamp 17 having a C-shape in which a part of a ring shape is cut, as shown in FIG. 7. The C-shaped clamp 17 in which the part is cut has a plurality of bolt passing holes 17a in a circumferential direction, and for example, a protruding portion is formed by a dowel processing 17b at an inner peripheral side of the C-shape. In this way, the protruding portion (the dowel processing 17b) can be fit into the key groove 12 formed on an outer peripheral surface of the stator core assembly 6. Here, a portion represented by reference numeral 17c is a bent portion that corresponds to a portion represented by reference numeral 13c in FIG. 2. By providing the bent portion 17c, the stator can be held in a similar state to the case of the clamp 13 shown in FIG. 4.

Figure 5:
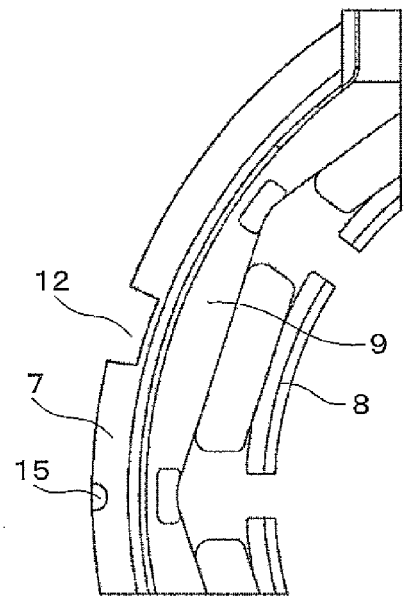
FIG. 5 is an exploded partial top view showing a part of the stator.
Figure 6:
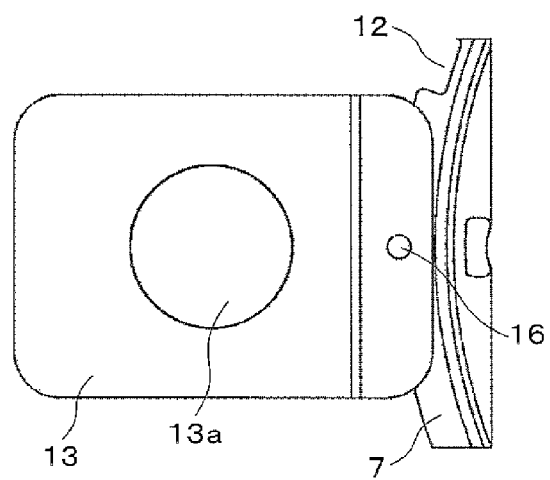
FIG. 6 is a top view showing a state in which another clamp is mounted on the stator shown in FIG. 5.

In addition, as shown in FIG. 5, a protruding portion (a dowel processing 17b) shown in FIG. 7 may be fit into the concavities 15 such as a dowel hole formed on the ring-shaped yoke portion 7 of the stator core. According to the C-shaped clamp 17, it is not necessary to use a plurality of clamps 13, and clamping can be carried out by using only one clamp. Therefore, the workability can be improved.

The embodiments of the present invention are not limited to each of the above embodiments and include various modifications that may be anticipated by one skilled in the art. In addition, the effects of the present invention are also not limited to the description above. That is, various additions, changes, and partial deletions can be made in a range that does not exceed the general concept and object of the present invention as claimed in the Claims and equivalents thereof.

What is claimed is:

1. A structure for mounting a resolver in a housing, the structure comprising:
   the housing having an opening for receiving the resolver, wherein a stepped portion is formed on an inner surface of the opening;
   an output shaft;
   the resolver disposed in the opening, the resolver comprising:
   a stator including a stator core having a ring-shaped yoke portion and a plurality of pole teeth extending inward from the yoke portion, wherein concavities are provided with the yoke portion, and
   a rotor attached to the output shaft and disposed inside the stator;
   a clamping member arranged on an end surface of the housing and having protruding portions,
   wherein an one end of the stator core is contacted with the stepped portion, an other end of the stator core is projected from the opening in an axial direction, and
   wherein the protruding portions of the clamping member are engaged with the concavities respectively so that the stator core is pressed in the axial direction by the clamping member.

2. The structure for mounting a resolver according to claim 1, wherein
   wherein the concavities are axially extending grooves formed on an outer peripheral surface of the stator core, and the protruding portions of the clamping member are engaged with the axially extending grooves respectively.

3. The structure for mounting a resolver according to claim 1, wherein the clamping member has a C-shape in which a part of a ring shape is cut, and the protruding portions are formed at an inner side thereof.

4. The structure for mounting a resolver, according to claim 1, wherein the clamping member comprises plural clamps in forms of plates, a bent portion which is displaced in parallel toward a thickness direction thereof is formed at a side portion of the clamp, and the protruding portion projecting toward a direction opposite to a displacing direction is provided to the bent portion.

5. The structure for mounting a resolver according to claim 4, wherein the protruding portion has a shape of a truncated square pyramid.

6. The structure for mounting a resolver according to claim 4, wherein the protruding portion is provided by circle dowel processing.

7. The structure for mounting a resolver according to claim 3, wherein the clamping member comprises a clamp in a form of a plate, a bent portion which is displaced in parallel toward a thickness direction thereof is formed at an inner peripheral portion of the clamp, and the protruding portion projecting toward a direction opposite to a displacing direction is provided to the bent portion.

8. The structure for mounting a resolver according to claim 7, wherein the protruding portion is provided by circle dowel processing.

9. The structure for mounting a resolver according to claim 2, wherein a projection is formed on the inner surface of the opening, and the projection is engaged with one of the grooves.

* * * * *